May 7, 1963 — E. A. VERRINDER ET AL — 3,088,574
METHOD OF AND APPARATUS FOR HANDLING CASES
Original Filed July 11, 1955 — 4 Sheets-Sheet 4

INVENTORS
ERNEST A. VERRINDER
EARLE J. McGRATH
BY Hans G. Hoffmeister
ATTORNEY 3,088,574
METHOD OF AND APPARATUS FOR
HANDLING CASES
Ernest A. Verrinder, Riverside, and Earle J. McGrath, San Bernardino, Calif., assignors to FMC Corporation, a corporation of Delaware
Original application July 11, 1955, Ser. No. 521,011, now Patent No. 2,993,315. Divided and this application June 18, 1959, Ser. No. 821,196
6 Claims. (Cl. 198—21)

This invention pertains to apparatus for handling boxes, cases and the like and more particularly relates to an improved apparatus for loading cases on and removing cases from a support surface, such as a pallet.

This application is a division of U.S. application Ser. No. 521,011, filed July 11, 1955 which issued as Patent 2,993,315.

In present day processing plants pallets are used extensively for handling both semi-finished and finished products. When the product is disposed in cases, the cases can be stacked one on top of the other and several stacks can be arranged side-by-side on the pallet. With such an arrangement, the cases can be economically and efficiently moved from place to place in the plant by means of a fork lift truck that has tines which are adapted to be inserted in or under the pallet to lift the pallet and the load of cases thereon.

In bottling plants, bottles are continuously being washed, filled and put in cases, and cases of full bottles are continuously being stacked on pallets for removal from the plant. Since cases of full bottles are quite heavy, it is difficult in a modern plant for men to continuously stack full cases on pallets fast enough to keep up with the filling and casing operations.

It is an object of the present invention to provide an efficient apparatus for unloading cases of bottles or the like from a pallet.

Another object is to provide means for shifting lines of stacks of cases between a pallet and a conveyor.

Another object is to provide improved conveying means for a pallet loading machine.

Another object is to provide an apparatus in which the elements are automatically controlled to carry out their individual functions in a timed and coordinated sequence.

Other and further objects and advantages of the present invention will become apparent from the following description taken in connection with the accompanying drawings.

*Modified Arrangement No. 1*

Figure 1:
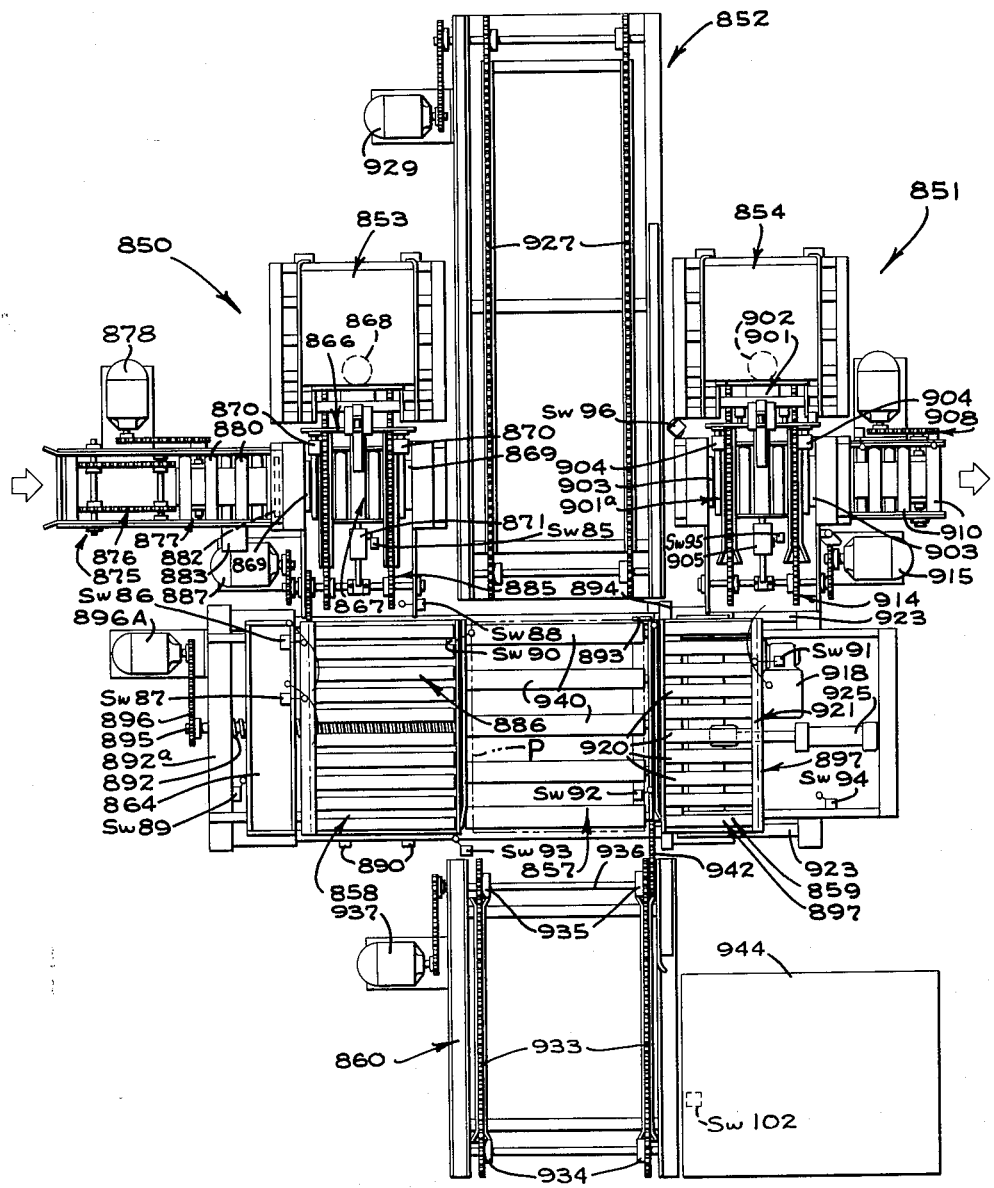
FIG. 1 is a diagrammatic plan of the case handling machine of the present invention.

In FIG. 1 the novel arrangement of case handling machines of the present invention is illustrated. The various elements used in this arrangement are substantially identical to those disclosed in the above-mentioned parent application Serial No. 521,011 now Patent 2,993,315 and reference may be had to said patent for a complete description of the structure and operation of any element that is not completely described hereinafter. In this arrangement, a pallet loading machine 850 is positioned in substantially parallel, spaced relation to a pallet unloading machine 851. A conveyor 852, arranged to discharge pallets loaded by the loading machine 850, is disposed between the stacker unit 853 of the pallet loader and the unstacker unit 854 of the pallet unloader. A conveyor section 857, which serves as both the pallet unloading station and the pallet loading station, is positioned between a stack conveyor 858 of the loading machine and a stack conveyor 859 of the unloading machine, while a conveyor section 860, which is arranged to deliver pallets loaded with cases of empty bottles, is located forwardly of the conveyor section 857.

In operation, a pallet, loaded with stacks of cases of empty bottles, is deposited by a fork lift truck on the pallet delivery conveyor 860. The conveyor 860 moves the pallet onto the conveyor section 857 where it engages switch Sw90 and is stopped in lateral alignment with a ram 864 of the loading machine. The pallet loading machine 850 is started and, when a line of stacks of cases of full bottles is formed on the stack conveyor 858, the ram 864 is actuated to shift the line onto the pallet, moving one line of stacks of cases of empty bottles from the pallet onto the unloader stack conveyor 859, which then delivers the stacks one by one into the unstacker unit 854. When the second line of stacks of cases of full bottles is formed by the pallet loading machine 850, the ram shifts it onto the pallet, forcing the remaining line of stacks of cases of empty bottles onto the unstacker conveyor 859. Since the pallet is then loaded with cases of full bottles, it is conveyed onto the pallet discharge conveyor 852 for delivery to a pickup station.

The pallet loader 850 comprises the stacking unit 853 which is substantially identical to the stacker-unstacker unit disclosed in the above-mentioned Patent 2,993,315 and comprises a fork carriage 866, a fork 867 mounted on the carriage, a power cylinder 868 for raising the fork carriage, case-supporting blades 869 controlled by solenoids 870, a pivotal paddle 871 arranged to actuate a switch Sw85, and a plurality of electric control switches Sw81, Sw82, Sw83 and Sw84 (not shown) mounted at certain locations throughout the unit. The stacker unit 853 is arranged to receive cases one at a time from a full case conveyor 875 which comprises an endless chain section 876 and a live roll section 877. Both sections of the conveyor are driven by a motor 878, the live roll section being driven at a faster speed than the endless chain section. The live roll section has a plurality of rollers 880, which lie between the fingers of the fork 867, the top surfaces of the rollers being above the top of the fingers when the fork is in its lowered position. Movement of cases along the conveyor 875 is controlled by a stop bar 882 which is spring-urged upwardly to a latched, case-arresting position and is connected to a solenoid 883 in such a way that, when the solenoid is energized, the stop bar actuating mechanism is unlatched, permitting the bar to drop by gravity.

After a stack is formed in the stacker unit, it is deposited on the stack conveyor 858 which comprises an endless chain section 885 and a live roll section 886 both driven by motor 887. The chain section 885 has an upper run extending into the stacker unit at a level slightly below the level of the tops of the rollers of the case delivery conveyor section 877 but above the tops of the fingers of the fork when the fork is in lowered position. Electric switches Sw88, Sw86 and Sw87 are mounted to extend into the path of a stack of cases being advanced along the stack conveyor 858. A pair of fixed stops 890 stop the first stack of cases. The second and third stacks come to rest against the preceding stack. The ram 864 is moved, by means of a power screw 892, from a position contacting switch Sw89, transversely over the stack conveyor section 886 to push a line of stacks of cases off the stack conveyor and onto the pallet P (shown in dot-dash lines) that is loaded with stacks of cases of empty bottles, and has been positioned against a stop bar 893 on the conveyor section 857 by the conveyor 860. The bar 893 is arranged to be moved to and from a position in the path of the pallet by means of a solenoid 894. The power screw 892 is suitably journalled in a stationary frame 892a and is operatively connected to the ram 864 to cause movement of the ram upon rotation of the screw. A sprocket 895 is keyed to the end of the screw and is arranged to be driven through a suitable power driven chain 896 from a reversible motor 896A. A switch Sw93 is positioned to be actuated by the ram carriage, a switch Sw91 is mounted on a traversing conveyor 897 to be actuated by one of the cases that is shifted onto the conveyor, a switch Sw92 is positioned to be contacted by the traversing conveyor in the load position adjacent the pallet, and a switch Sw94 is positioned to be contacted by the traversing conveyor when it is aligned with the unstacker unit 854.

The unloading machine 851 comprises the unstacker unit 854, a fork carriage 901, a fork 901a, a power cylinder 902 for raising the fork carriage, case-supporting blades 903 controlled by solenoids 904, a pivotable paddle 905 arranged to actuate a switch Sw95, and a plurality of other switches Sw96, Sw97, Sw98, Sw99 and Sw100 (not shown). The unstacker unit 854 is arranged to discharge cases one at a time onto a case discharge conveyor 908 which is similar to the live roll section 877 of the full case delivery conveyor. The discharge conveyor 908 has a plurality of belt-driven rollers 910 disposed between the fingers of the fork 901a at a slightly higher level than the level of the fingers when the fork is in its lowered position. The portion of the discharge conveyor that is under the fork 901a is pivotally mounted for downward movement and is operatively connected to the paddle 905 so that, when the paddle is pivoted downwardly by a stack of cases on the stack conveyor 859, the movable part of the discharge conveyor will be moved to a lower level than the level of the stack conveyor 859 to permit the stack conveyor to bring the stack into the unstacker unit.

The stack conveyor 859 of the unloading machine 851 comprises an endless chain section 914 driven by a motor 915 and the live roller traversing conveyor section 897 which is driven by a motor 918. The endless chain section 914 has an upper run extending into the unstacker unit at a level below the normal level of the rollers 910 but above the level of the rollers when they are depressed by the paddle 905. The traversing conveyor 897 comprises a plurality of spaced parallel rollers 902 journalled in a rigid frame 921 which, in turn, is mounted for lateral, sliding movement on a pair of stationary rods 923. A double acting power cylinder 925 is operatively connected to the frame 921 to move the traversing conveyor section 897 from a position in line with the endless chain section 914 to a position in contact with the switch Sw92 and closely adjacent the central conveyor section 857 to receive a line of stacks of cases therefrom.

The pallet discharge conveyor 852 comprises a pair of endless chains 927 driven by a motor 929 in a direction to carry loaded pallets away from the pallet loading and unloading station. The pallet delivery conveyor comprises the endless chain section 860 and the roller section 857. The section 860 comprises a pair of chains 933 trained around idler sprockets 934 and drive sprockets 935 that are keyed to a shaft 936 driven by a motor 937. The roller section 857 comprises a plurality of interconnected rollers 940 driven by a drive chain 942 which is trained around a pulley on the drive shaft 936.

Figure 2:
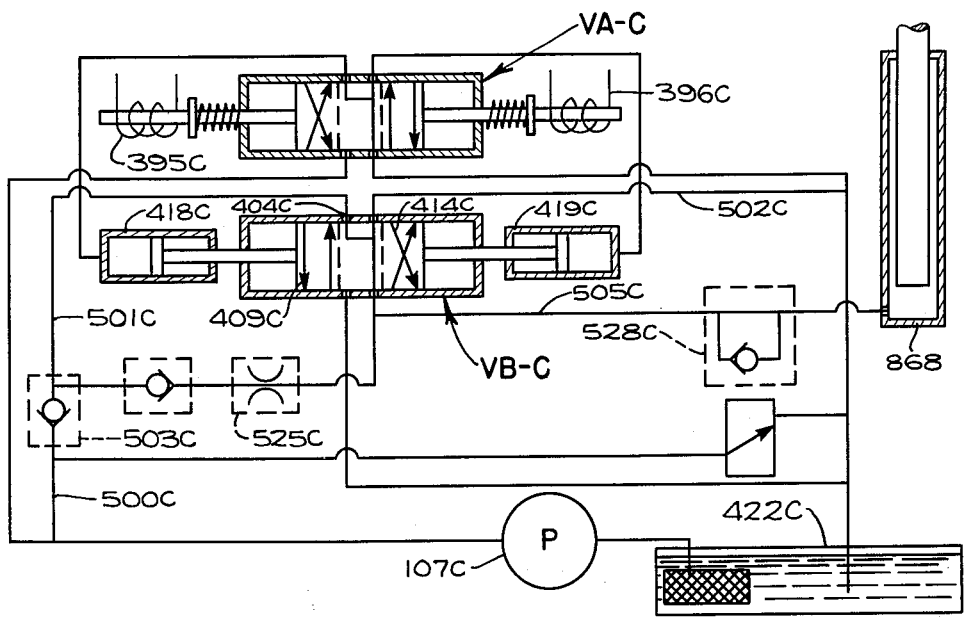
FIGS. 2 and 3 are schematic diagrams of the hydraulic control circuits used in the arrangement of FIG. 1.

The hydraulic circuit, employed by the pallet loading machine 850 of FIG. 1, is illustrated in FIG. 2. This circuit is identical to a portion of the hydraulic circuit which is shown in FIG. 25 of said Patent 2,993,315 and used in the combination unloader-loader of FIG. 1 of that patent.

When the pump 107C is operating, fluid under pressure is directed through line 500C—501C to port 404C of control valve VB–C. When the fork raising solenoid 396C is energized, fluid is directed through cross-passage 414C and line 505C to the fork power cylinder 868 to raise the fork carriage 866. When the fork lowering solenoid 395C is energized, the fork power cylinder 868 is drained and pressurized fluid is directed through line 502C to the reservoir, and the fork is permitted to descend.

Figure 3:
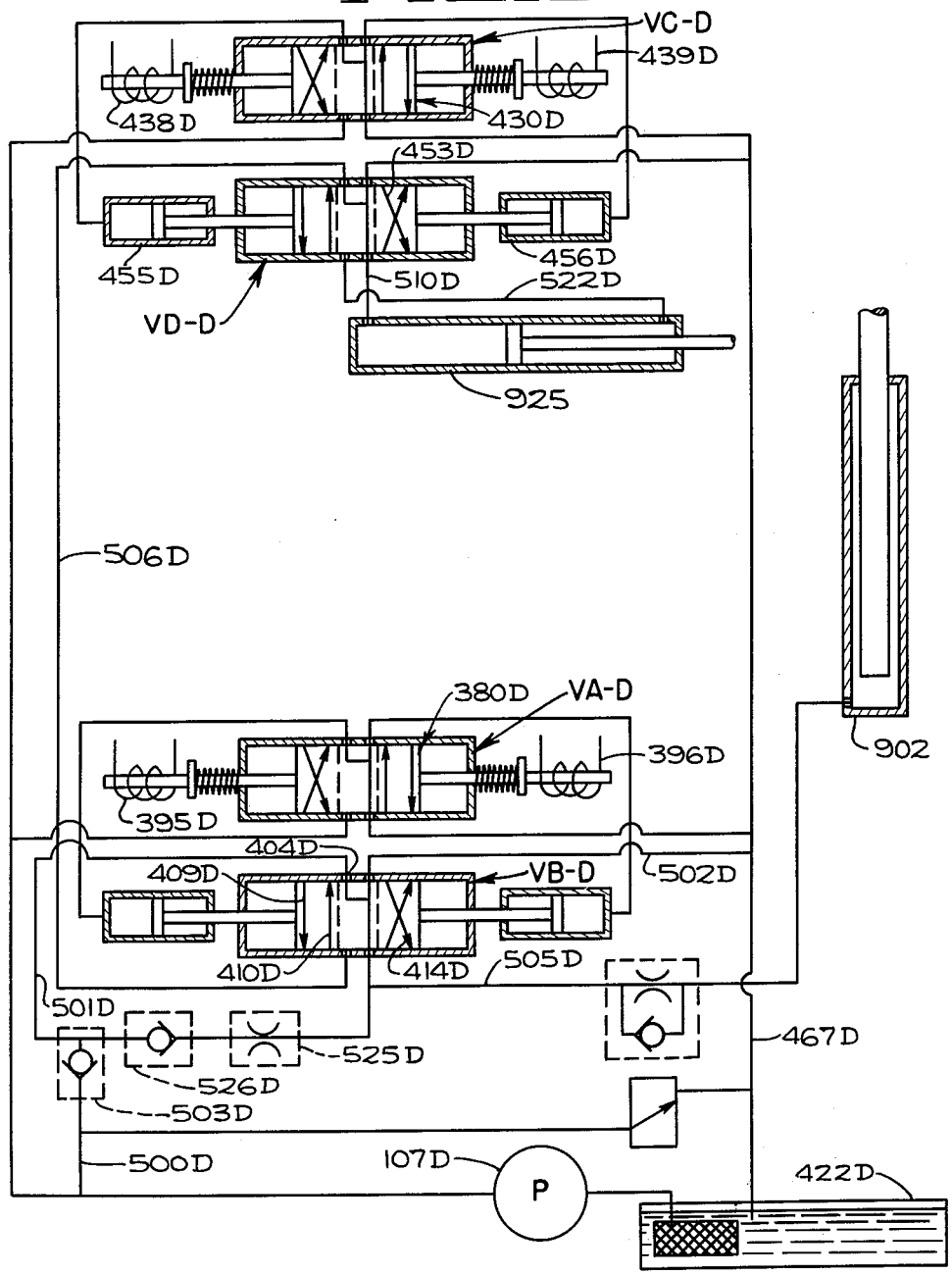

The hydraulic circuit used by the pallet unloading machine is illustrated in FIG. 3. Again, this circuit is substantially the same as that shown in FIG. 25 of Patent 2,993,315 and used in the machine of FIG. 1.

When the pump 107D is operating, fluid is directed through lines 500D—501D to port 404D of control valve VB–D. When the fork raising solenoid 396D of pilot valve VA–D is energized, the fluid is directed through cross-passage 414D of valve VB–D and line 505D to power cylinder 902 to raise the fork carriage 901. When the fork lowering solenoid 395D of pilot valve VA–D is energized, the power cylinder 902 is drained and pressurized fluid is directed through passage 409D and supply line 506D to the control valve VD–D. When there is fluid in supply line 506D and the solenoid 439D of pilot valve VC–D is energized, the fluid is directed through cross-passage 453D of valve VD–D and line 510D to the power cylinder 925 to move the traversing conveyor 897 into alignment with the stacker unit 854. If the solenoid 438D of pilot valve VD–D is energized when there is fluid in supply line 506D, the fluid is directed through passage 450D of valve VD–D and line 522D to the power cylinder 925 to return the traversing conveyor to a position adjacent the central unloading station of the machine.

Figure 4:
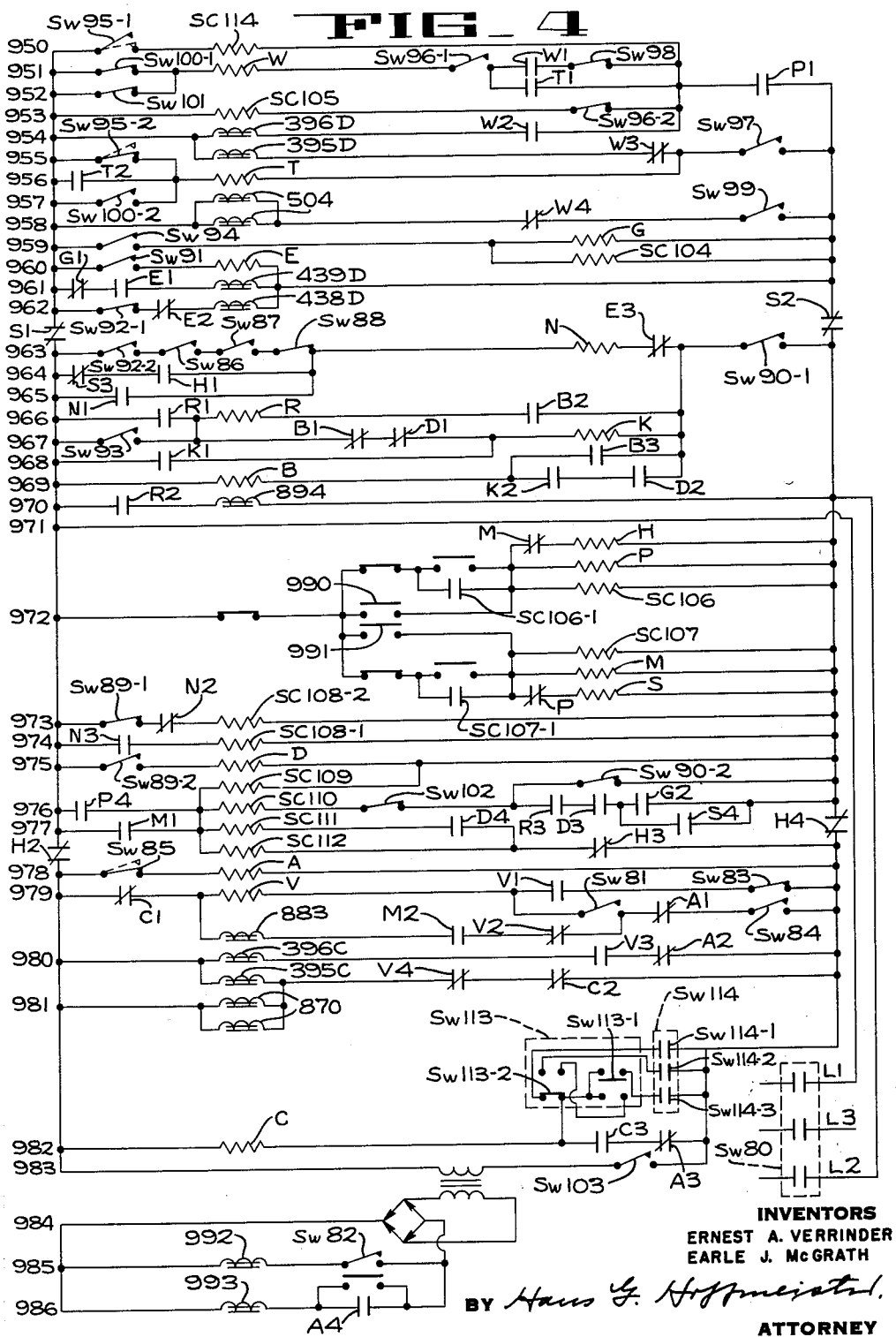
FIG. 4 is a schematic wiring diagram of the electrical control system used in the arrangement of FIG. 1.

The electric control circuit, for the arrangement of FIG. 1, is shown in FIG. 4. The electric switches are shown in their normal position, as they were wired by the switch manufacturer. It will be understood, however, that the paddle 871 of the stacker unit 853 is initially adjusted so that, when the paddle is in its normal spring-urged upper position, the normally closed switch Sw85 in circuit 978 is opened. Similarly, the paddle 905 of the unstacker 854 is initially adjusted so that when the paddle is in its normal, spring-urged upper position, the switch Sw95 will be actuated to close the normally open contact Sw95–1 in circuit 950, and open the normally closed contact Sw95–2 in circuit 955. FIG. 27 shows the positions of the various elements of the machines 850 and 851 at the start of a cycle. It will be noted that, in the pallet loading machine 850, when the ram 864 is in the load position contacting switch Sw89 to open contact Sw89–1 in circuit 973 and close contact Sw89–2 in circuit 975, the full case stop bar 882 is raised, and the fork carriage 866 is in its lowered position holding switch Sw84 in circuit 979 closed. In the unloading machine 851, the traversing conveyor 897 is disposed adjacent the central loading station contacting switch Sw92 to hold contact Sw92–1 in circuit 962 open and contact Sw92–2 in circuit 963 closed, and the fork carriage 901 is in its lowered position holding switch Sw97 in circuit 956 closed.

To put both machines into operation, a master switch Sw80 is closed to energize trunk conductors L1 and L2. The unloader start button 990 and the loader start button 991, both in circuit 972, are pushed to energize circuit 972 and energize relays P and M and to close the magnetic starting coil SC–106 of the motor of pump 107C and the starting coil SC–107 of the motor of pump 107D. Also, the photo relay Sw96 in the unstacker unit 854 is turned on.

Therefore, at the start of a cycle when a pallet loaded with cases of empty bottles is deposited on the conveyor 860, relays P and M in circuit 972 are energized, relay D in circuit 975 is energized, the magnetic starting coil SC–114 in circuit 950 is energized to start the case discharge conveyor of the unloader, the magnetic starting coil SC–105 in circuit 953 is energized to start the endless chain section of the unloader stack conveyor, the fork lowering solenoid 395D in circuit 954 is energized, the magnetic starting coil SC–109 in circuit 976 is energized to start the loaded pallet discharge conveyor 852 of the loading machine, the magnetic starting coil SC–110 in circuit 976 is energized to start the pallet conveyor 860, the magnetic starting coil SC–111 in circuit 977 is energized to start the stack conveyor 858, the magnetic starting coil SC–112 in circuit 977 is energized to start the full case conveyor 875, the solenoid 883 in circuit 979 has been energized to pull down the stop bar 882 of the full case conveyor, the fork lowering solenoid 395C in circuit 980 is energized, and the blade solenoids 870 in circuit 981 are energized.

A pallet loaded with stacks of cases of empty bottles is positioned on the pallet conveyor 860 by means of a fork lift truck which runs up a ramp 944 and temporarily opens switch Sw102 in circuit 976 to stop the conveyor 860 while the loaded pallet is positioned thereon. The pallet is carried into the machine where it engages switch Sw90 to open contacts Sw90–2 in circuit 976 to stop the conveyor 860. Cases of full bottles are now advanced by the full case conveyor 875. Since the stop bar 882 is already down, the first case is moved into the stacker unit 853 to contact and close switch Sw81 in circuit 979. Relay V is energized and locked in through contact V1. Contact V4 in circuit 980 is opened, de-energizing the fork lowering solenoid 395C, and contact V3 in circuit 980 is closed, energizing the fork raising solenoid 396C to start the upward movement of the fork 867. Contact V2 in circuit 979 is opened to de-energize the solenoid 883 and permit the stop bar to be raised in front of the line of full cases on the full case conveyor 875.

As the fork carriage is elevated, it moves away from switch Sw84 in circuit 979, permitting switch Sw84 to open. Switch Sw82 in D.C. circuit 985 is closed to energize solenoid 992 to register the first case on the counter Sw114. At the top of its stroke, the fork carriage opens switch Sw83 in circuit 979 to de-energize relay V. Contact V3 in circuit 980 is opened, de-energizing the fork raising solenoid 396C and contact V4 in circuit 980 is closed, energizing the fork lowering solenoid 395D and permitting the fork to be lowered and switch Sw83 to close. The closing of contact V4 in circuit 980 also energizes the solenoids 870 in circuit 981 whereby the blades 869 are projected inwardly under the case to support the case and permit the fork to continue downward. At the bottom of the stroke, the fork carriage closes switch Sw84 in circuit 979, energizing the full case stop bar solenoid 883 to pull down the stop bar 882 and permit the full case conveyor 875 to move the second case into the stacker. The second case contacts and closes switch Sw81 in circuit 979 to start another case elevating cycle. When the last case has been counted and contact Sw114–1 of switch Sw114 in circuit 982 has been closed, relay C is energized and locked in through contact C3. Contact C1 in circuit 979 is opened to de-energize relay V. Contact V2 in circuit 979 is opened, preventing the lowering of the stop bar 883. Contact V3 in circuit 980 is opened, de-energizing the fork raising solenoid 396C. Contact C2 in circuit 981 is opened, de-energizing the fork lowering solenoid 395C and the blade solenoids 870 in circuit 981. Since both the fork raising solenoid and the fork lowering solenoid are de-energized, the hydraulic valve VB–C assumes a centered position, permitting the fork power cylinder 868 to drain to the reservoir through the needle valve 525C, causing a slow descent of the fork and the stack of cases formed thereon.

When the fork deposits the stack on the full case conveyor 875, the center portion of this conveyor moves downwardly to deposit the stack on the endless chain section 885 of the stack conveyor 858 for removal from the stacker. As the cradle of the conveyor moves downwardly, it depresses through a mechanical linkage, the paddle 871 to close switch Sw85 in circuit 978 and energize relay A. Contact A4 in D.C. circuit 986 is closed to energize the counter reset solenoid 993 to reset case counter Sw114. Contact A3 in circuit 982 opens to de-energize relay C, closing contact C1 in circuit 979. As soon as the stack moves off the paddle 871, the switch Sw85 in circuit 978 opens, de-energizing relay A. Contact A1 in circuit 979 closes to energize stop bar solenoid 883 to pull down the bar 882 and start the formation of the second stack of cases.

As the first stack moves along the stack conveyor 858, it momentarily contacts switches Sw88, Sw86, and Sw87, all in circuit 963, and comes to rest against the fixed stops 890. The second stack comes to rest against the first stack, holding switch Sw87 closed. The third stack closes switch Sw86 and momentarily opens switch Sw88. As soon as the third stack clears switch Sw88, circuit 963 is energized, energizing relay N which locks in through contact N1. Contact N2 in circuit 973 is opened and contact N3 in circuit 974 is closed to energize a coil SC–108–1 of a magnetic starter. When energized, the coil SC–108–1 causes the motor 896A of the power screw 892 to rotate the screw in a direction to move the ram 864 to load the new stacks of cases on the pallet. Coil SC–108–1 will hereinafter be referred to as the ram loading-stroke coil. Coil SC–108–2 in circuit 973 causes rotation of the power screw in a direction to retract the ram to its initial position and will be referred to as the ram retracting coil. Since the ram loading stroke coil SC–108–1 is energized by the closing of contact N3 in circuit 974, the ram moves forwardly to push the newly formed line of cases onto the pallet which, as previously mentioned, is loaded with stacks of cases of empty bottles. The line of cases of empty bottles, which is closest the traversing section 897 of the unloading machine pallet conveyor, is pushed off the pallet and onto said traversing section. During the forward movement of the ram, the ram carriage contacts and closes switch Sw93 in circuit 967, energizing relay K which locks in through contact K1. The line of stacks of cases, that was shifted onto the traversing conveyor section 897, engages and closes switch Sw91 in circuit 960 to energize relay E. Contact E1 in circuit 961 is closed to energize the solenoid 439D that is effective to cause the traversing conveyor section to be moved to unload position in alignment with the unstacker unit. Contact E2 in circuit 962 is opened, de-energizing the solenoid 438D that is effective to return the traversing section to position adjacent the pallet. Contact E3 in circuit 963 is opened, de-energizing relay N. Contact N3 in circuit 974 is opened to de-energize the ram loading stroke coil SC–108–1, and contact N2 in circuit 973 is closed to energize the ram retracting coil SC–108–2. As the traversing conveyor section 897 moves toward unload position, switch Sw92 is released permitting contact Sw92–1 in circuit 962 to close. Contact Sw92–2 in circuit 963 is opened. When the traversing conveyor reaches unload position, it contacts and closes switch Sw94 in circuit 959 to energize relay G and to energize the magnetic starting coil SC–104 of motor 918 to rotate the rollers of the traversing section for advancing the line of stacks into the unstacker unit 854. Contact G1 in circuit 961 opens, de-energizing the traversing conveyor unload solenoid 439D.

The lines of stacks of empty cases are moved one by one into the unstacker unit 854 where they are unstacked following the previously explained unstacking operation. When the last stack leaving the traversing section clears switch Sw91 in circuit 960, the switch opens de-energizing relay E. Contact E2 in circuit 962 closes to energize the solenoid 438D whereby the traversing section is returned to the position adjacent the pallet. When the traversing conveyor reaches this initial position and contacts switch Sw92, contact Sw92–1 in circuit 962 is opened, de-energizing the return solenoid 438D. Contact Sw92–2 in circuit 963 is closed.

When the ram 864 returns to its initial position to await the formation of a new line of stacks of full cases, it contacts switch Sw89 closing contact Sw89–2 in circuit 975 to energize relay D, and to open contact Sw89–1 in circuit 973 to de-energize the ram retract coil SC–108–2.

Contact D2 in circuit 969 is closed, energizing relay B which locks in through contact B3. A new line of stacks is formed by the stacker unit 853 and positioned on the stack conveyor 858 in front of the ram 864, holding switches Sw86 and Sw87 in circuit 963 closed. Since the traversing conveyor returns to position adjacent the pallet while this second line of stacks was being formed, contact Sw92–2 in circuit 963 is also closed at this time, and accordingly relay N is energized. Contact N3 in circuit 974 is closed, energizing the ram loading stroke coil SC–108–1 to start the ram forward to push the second line of stacks of cases of full bottles onto the pallet, forcing the remaining line of stacks of cases of empty bottles off the pallet and onto the traversing conveyor section 897. As the ram advances, the ram carriage again closes switch Sw93 in circuit 967. Since contact B2 in circuit 966 was closed the first time the ram carriage closed switch Sw93, relay R in circuit 966 is energized by this second advance of the ram carriage. Contact R2 in circuit 970 is closed, energizing solenoid 894 which controls the pallet holding stop 893. When the solenoid 894 is energized, the stop 893 is pulled away from the pallet, releasing the pallet for subsequent movement out of the machine on conveyor 852.

The line of stacks of cases of empty bottles, that was shifted onto the traversing conveyor section 897, engages and closes switch Sw91 in circuit 960 to energize relay E. Contact E1 in circuit 961 is closed to energize the solenoid 439D that is effective to cause the traversing conveyor to be moved to unload position. Contact E3 in circuit 963 is opened, de-energizing relay N. Contact N3 in circuit 974 is opened to de-energize the ram loading-stroke coil SC–108–1, and contact N2 in circuit 973 is closed to energize the ram retracting coil SC–108–2 and start the ram back to initial position. When the traversing conveyor 897 reaches unload position, it contacts and closes switch Sw94 in circuit 959 to energize relay G and close contact G2 in circuit 976. Then, when the ram returns to its initial position to actuate switch Sw89 and close contact Sw89–2 in circuit 975, relay D is energized. Contact D3 in circuit 976 is closed, energizing the magnetic starter coil SC–110 to start the motor 937 of the pallet conveyor 860 and cause the pallet, loaded with cases of full bottles, to be moved onto the continuously operating pallet discharge conveyor 852. If another pallet loaded with cases of empty bottles has been positioned by the fork lift truck on the entrance end of the pallet conveyor, it will be moved into the loading-unloading station while the loaded pallet is carried out of the machine on the pallet discharge conveyor 852. When the last stack leaving the traversing conveyor 897 clears the switch Sw91 in circuit 960, the switch opens de-energizing relay E and closing contact E2 in circuit 962 to energize solenoid 438D whereby the traversing conveyor is returned to the position adjacent the pallet.

At the end of the cycle, the ram 864 is in its unload position, the fork 867 of the stacker is in its lower position, and the full case stop bar 882 is lowered. Also, the traversing conveyor 897 of the pallet unloader is disposed adjacent the pallet, and the fork carriage 901 of the unstacker is in its lowered position. Thus, both the pallet loading machine 850 and the pallet unloading machine 851 are ready for the cycle to be repeated.

From the foregoing description it will be seen that the present invention provides an apparatus for rapidly and efficiently removing cases from a pallet. The speed of operation is attained through the unitary movement of an entire line of stacks of cases from a pallet to a conveyor and vice versa, and by the inter-related automatic control arrangements which start each step in the unloading operation immediately after the preceding step has been completed. In the unloading operation, each line of stacks is shifted from the pallet to the stack conveyor as soon as the previously delivered line has been shifted along the stack conveyor a distance sufficient to permit the positioning of the new line on the stack conveyor. Also, each stack is moved into the unstacking unit as soon as the last case of the preceding stack leaves the unstacking unit.

Having thus described our invention, what we claim as new and desire to protect by Letters Patent is:

1. Apparatus for handling cases or the like comprising an article support member, a first conveyor having an elongate movable conveying surface disposed at a certain height in a horizontal plane, a support structure adjacent said conveyor, a second conveyor having a conveying surface, said second conveyor being mounted on said support structure with the conveying surface thereof at substantially the height of the conveying surface of said first conveyor and for lateral bodily reciprocating movement in the plane of said conveying surfaces and in a direction transverse to the longitudinal centerline of said elongate movable conveying surface, between a position in alignment with said first conveyor and a position adjacent said article support member and spaced from said aligned position and parallel to said elongate movable conveying surface, power means mounted on said support structure and connected to said second conveyor for reciprocating said second conveyor laterally between said positions, a pusher member disposed on the opposite side of said article support member from said second conveyor and movable toward said article support member in said transverse direction to operatively engage and shift a row of articles from said member over the side edge of said second conveyor and onto the conveying surface thereof, control means connected to said power means and arranged to normally dispose said second conveyor in said position spaced from said aligned position, and means carried by said second conveyor and arranged upon actuation by a case on said second conveyor to actuate said control means and thereby activate said power means to move said second conveyor laterally from said spaced position into alignment with said first conveyor.

2. Apparatus for handling cases or the like comprising an article support member, a first conveyor having an elongate movable conveying surface disposed at a certain height, a support structure adjacent said conveyor, a second conveyor having a movable conveying surface, said second conveyor being mounted on said support structure with the conveying surface thereof at substantially the height of the conveying surface of said first conveyor and for lateral bodily reciprocating movement in the plane of said conveying surfaces and in a direction transverse to the longitudinal centerline of said elongate movable conveying surface between a position in alignment with said first conveyor and a position adjacent said article support member and spaced from said aligned position and parallel to said elongate movable conveying surface, a pusher member disposed on the opposite side of said article support member from said second conveyor and mounted for movement in said transverse direction toward said article support member to operatively engage and shift a row of articles from said member over the side edge of said second conveyor and onto the conveying surface thereof, first power means for driving said movable conveying surface, first control means for said first power means, second power means mounted on said support structure and connected to said second conveyor for reciprocating said second conveyor laterally between said positions, second control means connected to said second power means and arranged to normally dispose said second conveyor in said position spaced from said aligned position, means carried by said second conveyor and arranged upon actuation by a case on said second conveyor to actuate said second control means and thereby activate said second power means to move said second conveyor laterally from said spaced position into alignment with said first conveyor, and means carried by said second conveyor and movable therewith to operate said first control means when said second conveyor is in alignment with said first conveyor to drive said conveying surface of said second conveyor.

3. Apparatus for handling cases or the like comprising a stationary member having a surface adapted to support a plurality of cases, a movable case carrier mounted for lateral reciprocating movement relatively to said stationary member in a plane substantially parallel to said surface, a movable conveying surface on said carrier disposed at substantially the level of the surface of said stationary member and arranged to be advanced in a certain direction, power means for advancing said movable conveying surface, means movably mounting said carrier for transporting the same and said conveying surface laterally in a horizontal plane from a case receiving position close to said stationary member to a case discharge position remote from said stationary member to carry cases from said receiving position to said discharge position, control means mounted adjacent said carrier and arranged upon actuation thereof to activate said power means and advance said movable conveying surface, means carried by said carrier for actuating said control means, and pusher means disposed on the opposite side of said stationary member from said case carrier and arranged for movement toward said carrier to advance cases onto the support surface of said stationary member and move cases therefrom onto said conveying surface of said carrier when said carrier is in said receiving position.

4. Apparatus for handling cases or the like comprising a stationary member having a surface adapted to support a plurality of cases, a movable case carrier mounted for lateral reciprocating movement relatively to said stationary member in a plane substantially parallel to said surface, a movable conveying surface on said carrier disposed at substantially the level of the surface of said stationary member and arranged to be advanced in a certain direction, power means for advancing said movable conveying surface, means movably mounting said carrier for transporting the same and said conveying surface laterally in a horizontal plane from a case receiving position close to said stationary member to a case discharge position remote from said stationary member to carry cases from said receiving position to said discharge position, control means mounted adjacent said carrier and arranged upon actuation to activate said power means and advance said movable conveying surface, means carried by said carrier for actuating said control means, pusher means disposed on the opposite side of said stationary member from said case carrier and arranged for movement toward said carrier to advance cases onto the support surface of said stationary member and move cases therefrom onto said conveyor surface of said carrier when said carrier is in said receiving position, means for driving said pusher means, and means mounted adjacent said stationary member and engageable by said carrier when in case receiving position and arranged to actuate said pusher drive means and thereby initiate movement of said pusher means.

5. Apparatus for handling cases, comprising a member having an article support surface, a first conveyor having an elongate movable conveying surface at substantially the level of said article support surface, a second conveyor having an elongate conveying surface parallel to but spaced from the elongate surface of said first conveyor, means mounting said first conveyor for bodily movement in a direction transverse to the longitudinal centerline of said elongate movable conveying surface from a row-receiving position parallel to but spaced from said second conveyor to a discharge position of alignment with said second conveyor, a pusher disposed on the opposite side of said article support surface from said first conveyor and mounted for movement toward said article support surface in said transverse direction to move a row of articles from said support surface over the side edge of said first conveyor and onto the conveying surface thereof, and power means for actuating the conveying surface of said first conveyor when said conveyors are in alignment to transfer a row of cases lengthwise from said first conveyor to said second conveyor.

6. In article handling apparatus, a first elongate conveyor, a second conveyor having an elongate article support surface mounted for movement between a row-receiving position spaced from but parallel to said first elongate conveyor and a discharge position in alignment with said first conveyor, means providing a second article support surface at substantially the elevation of the conveying surface of said second conveyor, and a pusher disposed on the opposite side of said second support surface from said second conveyor and mounted for movement toward said second support surface to move a row of articles on said second support surface to the conveying surface of said second conveyor when said second conveyor is in said row-receiving position, said second conveyor including means for moving articles on said elongate article support surface in a direction lengthwise of said surface onto said first conveyor when said second conveyor is in said discharge position.

References Cited in the file of this patent
UNITED STATES PATENTS

| | | |
|---|---|---|
| 1,399,528 | Sommers | Dec. 6, 1921 |
| 1,458,859 | Soderberg | June 12, 1923 |
| 1,808,134 | Gotthardt | June 2, 1931 |
| 1,871,832 | Absnieier | Aug. 16, 1932 |
| 2,120,751 | Jenny | June 14, 1938 |
| 2,228,887 | Peterson | Jan. 14, 1941 |
| 2,468,055 | Gibler | Apr. 26, 1949 |
| 2,661,100 | Ashford | Dec. 1, 1953 |
| 2,703,182 | Broberg et al. | Mar. 1, 1955 |
| 2,705,570 | Maissian | Apr. 5, 1955 |
| 2,813,638 | Miller | Nov. 19, 1957 |
| 2,885,097 | Lyon | May 5, 1959 |